US006532657B1

(12) United States Patent
Weimer et al.

(10) Patent No.: US 6,532,657 B1
(45) Date of Patent: Mar. 18, 2003

(54) PRE-SERVICE OXIDATION OF GAS TURBINE DISKS AND SEALS

(75) Inventors: Michael James Weimer, Loveland, OH (US); Bangalore Aswatha Nagaraj, West Chester, OH (US); Jon Conrad Schaeffer, Simpsonville, SC (US); Joseph Aloysius Heaney, III, Middletown, OH (US)

(73) Assignee: General Electric Co.,, Schnectedy, NY (US)

( * ) Notice: Subject to any disclaimer, the term of this patent is extended or adjusted under 35 U.S.C. 154(b) by 0 days.

(21) Appl. No.: 09/957,844

(22) Filed: Sep. 21, 2001

(51) Int. Cl.[7] .......................... B21K 25/00; B23P 15/04

(52) U.S. Cl. ...................................... 29/889.2; 29/889.7

(58) Field of Search ................................ 29/889.7, 889, 29/889.2; 416/241 R, 241 B; 148/516, 559, 675, 676, 677, 426

(56) References Cited

U.S. PATENT DOCUMENTS

| | | | | | |
|---|---|---|---|---|---|
| 3,754,902 | A | * | 8/1973 | Boone et al. | 420/443 |
| 3,754,903 | A | * | 8/1973 | Goward et al. | 420/443 |
| 4,536,932 | A | | 8/1985 | Athey | |
| 5,312,497 | A | | 5/1994 | Mathey | |
| 5,525,429 | A | | 6/1996 | Mannava et al. | |
| 6,270,852 | B1 | * | 8/2001 | Ulion et al. | 427/142 |
| 6,284,390 | B1 | * | 9/2001 | Bose et al. | 416/241 B |
| 6,287,644 | B1 | * | 9/2001 | Jackson et al. | 427/566 |
| 6,355,116 | B1 | * | 3/2002 | Chen et al. | 134/3 |
| 6,383,570 | B1 | * | 5/2002 | Bose et al. | 29/889.71 |
| 6,394,755 | B1 | * | 5/2002 | Stowell et al. | 416/241 B |
| 2001/0012568 | A1 | * | 8/2001 | Bose et al. | 428/615 |
| 2002/0031683 | A1 | * | 3/2002 | Lavery et al. | 428/668 |

* cited by examiner

*Primary Examiner*—I. Cuda-Rosenbaum

(57) ABSTRACT

A gas turbine component, such as a turbine disk or a rotating seal, is fabricated by furnishing a substrate shaped as a gas turbine component made of a nickel-base superalloy, and oxidizing the substrate to produce an oxidized substrate having thereon a layer comprising an oxide and having a thickness of at least about 500 Angstroms. The step of oxidizing is performed prior to entry of the component into service and in an atmosphere that does not contain combustion gas. The oxidized gas turbine component is thereafter placed into service.

19 Claims, 4 Drawing Sheets

PRE-SERVICE OXIDATION OF GAS TURBINE DISKS AND SEALS

This invention relates to gas turbine engines and, more particularly, to the fabrication of the turbine disks and seals, and their protection against oxidation and corrosion.

BACKGROUND OF THE INVENTION

In an aircraft gas turbine (jet) engine, air is drawn into the front of the engine compressed by a shaft-mounted compressor, and mixed with fuel. The mixture is burned, and the hot combustion gases are passed through a turbine mounted on the same shaft. The flow of combustion gas turns the turbine, which turns the shaft and provides power to the compressor and to the fan. In a more complex version of the gas-turbine engine, the compressor and a high-pressure turbine are mounted on one shaft having a first set of turbines, and the fan and a low-pressure turbine are mounted on a separate shaft having a second set of turbines. The hot exhaust gases and the air propelled by the fan flow from the back of the engine, driving it and the aircraft forward. The hotter the combustion and exhaust gases, the more efficient is the operation of the jet engine. There is thus an incentive to raise the combustion-gas temperature.

The turbine (sometimes termed a "turbine rotor") includes one or more turbine disks, a number of turbine blades mounted to the turbine disks and extending radially outwardly therefrom into the combustion-gas flow path, and rotating seals that prevent the hot combustion gases from contacting the turbine shaft and related components. The maximum operating temperature of the combustion gas is limited by the materials used in the turbine. Great efforts have been made to increase the temperature capabilities of the turbine blades, resulting in increasing combustion as operating temperatures and increased engine efficiency.

As the maximum operating temperature of the combustion gas increases, the turbine disk and seals are subjected to higher temperatures in the combustion-gas environment. As a result, oxidation and corrosion of the turbine disk and seals have become of greater concern. Alkaline sulfate deposits resulting from the ingested dirt and the sulfur in the combustion gas are a major source of the corrosion, but other elements in the aggressive combustion-and bleed gas environment may also accelerate the corrosion. The oxidation and corrosion damage may lead to premature removal and replacement of the turbine disk and seals unless the damage is reduced or repaired.

The turbine disks and seals for use at the highest operating temperatures are made of nickel-base superalloys selected for good toughness and fatigue resistance. These superalloys are selected for their mechanical properties. They have some resistance to oxidation and corrosion damage, but that resistance is not sufficient to protect them at the operating temperatures that are now being reached.

The current state of the art is to operate the turbine disks and seals without any coatings to protect them against oxidation and corrosion. At the same time, a number of oxidation-resistant and corrosion-resistance coatings have been considered for use on the turbine blades. These available turbine-blade coatings are generally too thick and heavy for use on the turbine disks and seals and also nay adversely affect the fatigue life of the turbine disks and seals. There remains a need for an approach for protecting turbine disks and seals against oxidation and corrosion as the operating-temperature requirements of the turbine disks and seals increase. This need extends to other components of the gas turbine engine as well. The present invention fulfills this need, and further provides related advantages.

BRIEF SUMMARY OF THE INVENTION

The present approach provides an approach for fabricating a nickel-base superalloy component of a gas turbine engine, such as a turbine disk or a seal, and components made thereby. The gas turbine component has improved oxidation and corrosion resistance as compared with conventional gas turbine components. There is very little increased weight and added dimension to the turbine component as a result of utilizing the present approach. The present fabrication approach is economically applied and is environmentally friendly. It is not limited by line-of-sight application procedures, so that otherwise-inaccessible portions of the component may be treated. The protection extends over the entire processed surface area of the component, so that protection is provided even in areas where there may be cracks or discontinuities in other applied coatings.

A method for fabricating a gas turbine component comprises the steps of furnishing a substrate shaped as a gas turbine component, such as a gas turbine disk or a seal, and made of a nickel-base superalloy, and oxidizing the substrate to produce an oxidized substrate having thereon a layer comprising an oxide and having a thickness of at least about 500 Angstroms. The step of oxidizing is performed in an atmosphere that does not contain combustion gas. The oxidized substrate is thereafter placed into service.

This approach may be used in conjunction with a number of additional processing steps. The step of furnishing the substrate may include a step of pre-processing the substrate by machining, peening, and grit blasting. A protective coating may be deposited on the substrate, so that the step of oxidizing produces an oxidized coating. The protective coating may include an element such as aluminum, chromium, silicon, phosphorus, or mixtures thereof.

The oxidizing step may be performed in an air atmosphere, so that there is some formation of nitrides as well. The oxidizing step may be performed in an oxygen-only atmosphere, such as from about 0.2 to about 1000 parts per million of oxygen. In a typical case, the step of oxidizing the substrate includes heating the substrate to a temperature of from about 1200° F. to about 1550° F., for a time of at least about 2 hours.

A top coating may optionally be deposited on the oxidized substrate after the oxidation but before the oxidized substrate is placed into service.

The present invention involves in-situ formation of an oxide layer, not deposition of a coating or a layer from a separate source. The approach does not involve line-of-sight deposition, so that the entire component is protected without regard to position relative to a source. The oxidation is performed after all forging and other mechanical surface processing of the component to its final shape and surface condition are completed, although subsequent coating that does not disrupt the oxide is permitted. Further mechanical operations after oxidation would disrupt the oxide and render it ineffective.

The oxide layer typically has a thickness of from about 1000 Angstroms to about 6000 Angstroms, so that it adds very little weight or dimension to the component. This thin oxide layer improves the oxidation and corrosion resistance of the component by at least 50 percent as compared with an unprotected component, without adversely affecting the mechanical properties such as strength, toughness, and fatigue resistance. The oxide layer includes oxides of the components of the superalloy, such as chromium, titanium, nickel, cobalt, aluminum, and tantalum, and may also include titanium and other nitrides if the oxidation is performed in air.

An important feature of the present processing is that the oxidation treatment is performed prior to the component entering service, and without combustion gas or other gas containing corrosive agents present. Prior turbine components are oxidized when they enter service and are heated to their operating temperatures, but that oxidation is performed in an environment that includes the combustion products which inhibit the formation of a protective oxide and include compounds such as the sulfides and carbides that contribute to corrosion damage. In that prior approach, the corrosive agents are incorporated into the surface of the turbine component before the oxide has a chance to form in the manner of the present approach.

Other features and advantages of the present invention will be apparent from the following more detailed description of the preferred embodiment taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
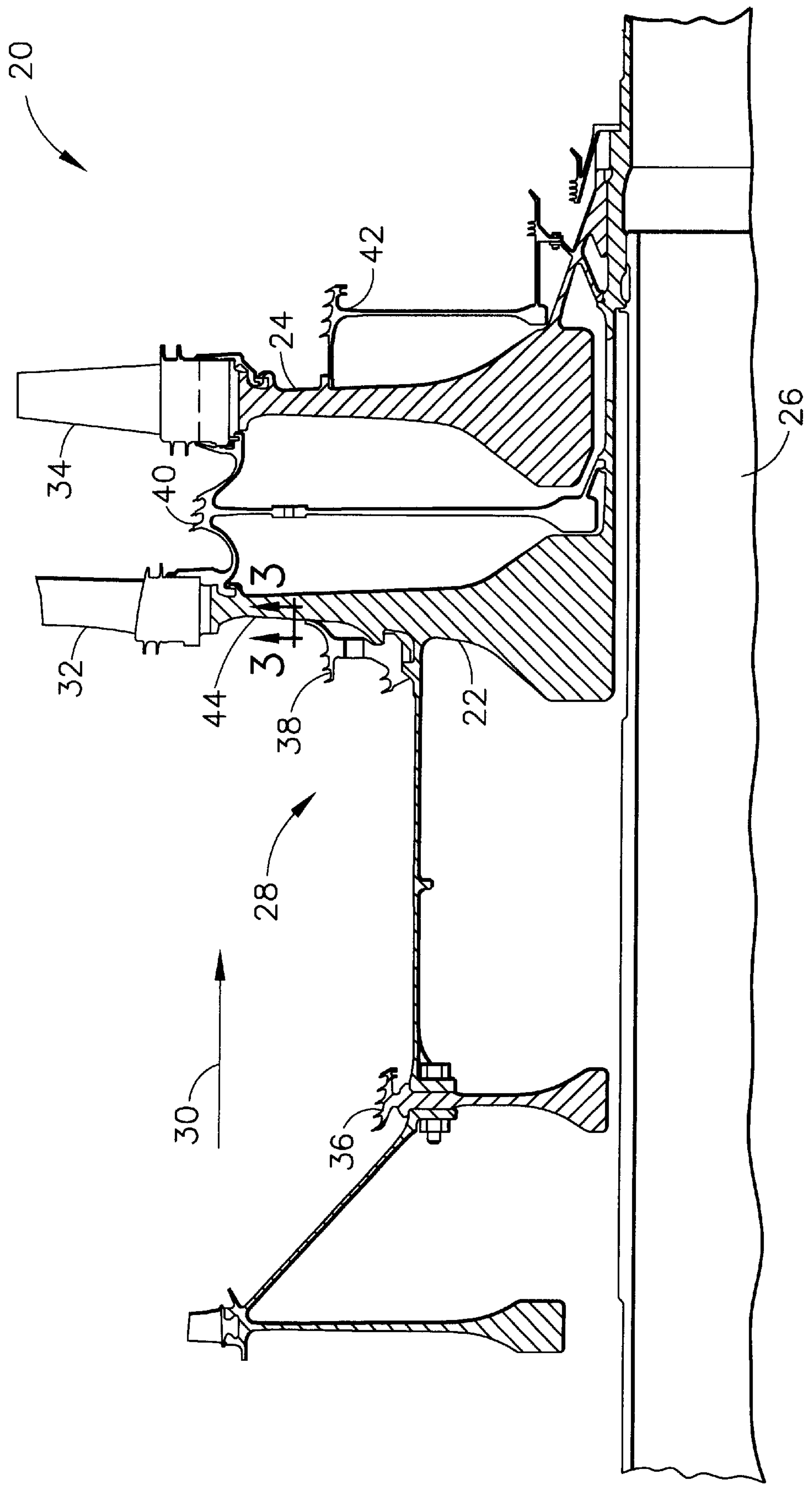
FIG. 1 is a schematic elevational view of a turbine-disk-and-seal structure.

FIG. 1 schematically depicts a turbine-disk-and-seal structure 20 including a stage 1 turbine disk 22 and a stage 2 turbine disk 24 mounted to a shaft 26. Seals 28 are mounted to the shaft 26 and rotate with the shaft 26 to protect the shaft 26 from the flow 30 of hot combustion gases. Sets of turbine blades 32 and 34 extend from the turbine disk 22 and the turbine disk 24, respectively. The turbine blades 32 and 34 are protected by their own protective systems, and are not the subject of the present invention. The present invention is concerned with damage to and protection of the turbine disks 22 and 24 and the seals 28. The present approach may be applied as appropriate to other components of the gas turbine engine, such as the stationary shroud seals (not shown).

The seals 28 include a CDP seal 36, a forward seal 38, an interstage seal 40, and an aft seal 42. The forward seal 38 and a forward-facing side 44 of the stage 1 turbine disk 22 are particularly subject to corrosion and oxidation damage due to the combination of heat and corrosive/oxidative effects of the contaminants in the bleed gas cooling. The preferred embodiment of the present invention is concerned with protecting these areas, although it is applicable to the protection of other areas and components as well.

Figure 2:
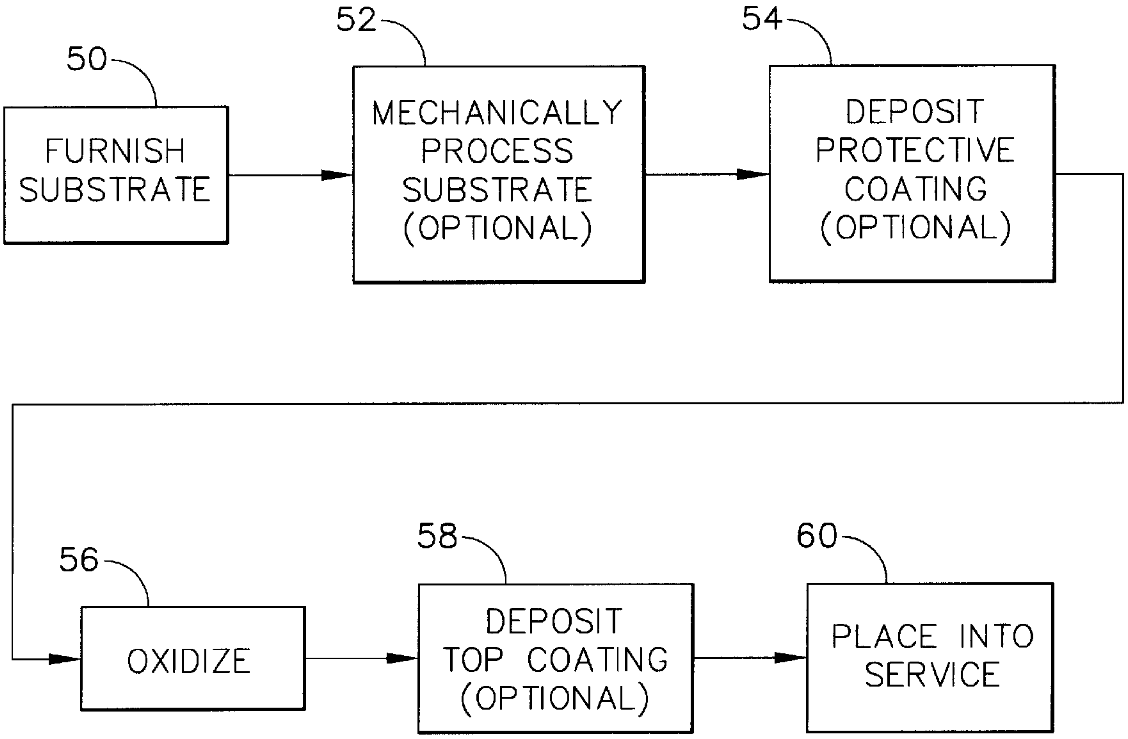
FIG. 2 is a block flow diagram of an approach for practicing the invention.
Figure 3:
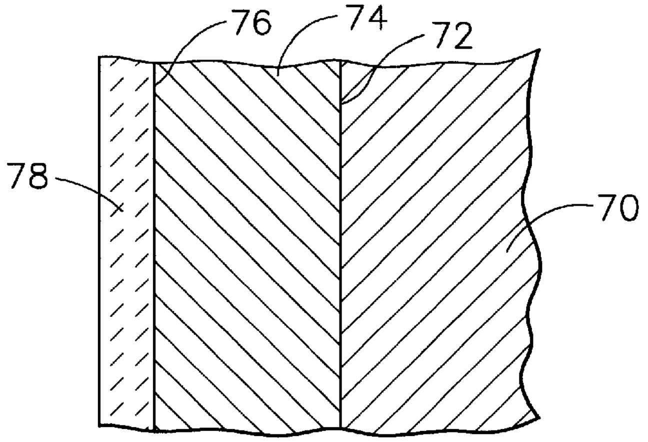
FIG. 3 is an enlarged schematic sectional view through the turbine disk of FIG. 1 along line 3—3, but prior to its entering service, illustrating a first embodiment of the invention.
Figure 4:
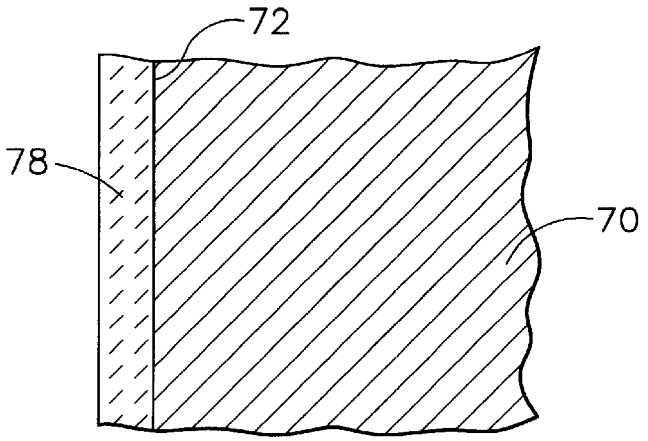
FIG. 4 is an enlarged schematic sectional view through the turbine disk of FIG. 1 along line 3—3, but prior to its entering service, illustrating a second embodiment of the invention.
Figure 5:
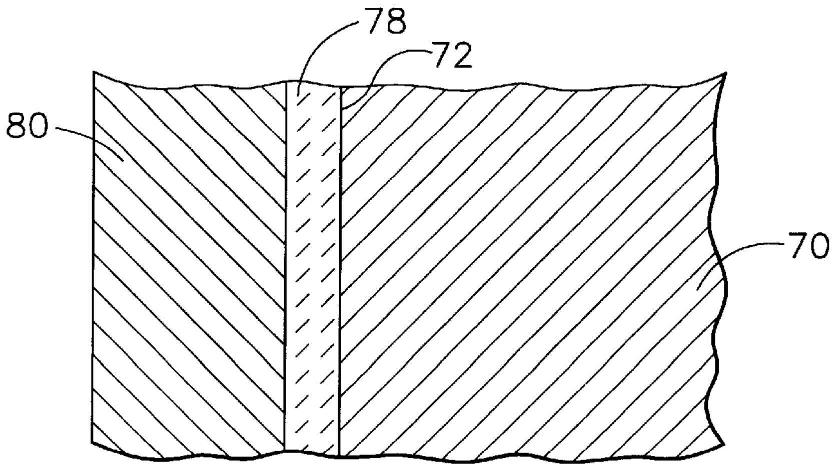
FIG. 5 is an enlarged schematic sectional view through the turbine disk of FIG. 1 along line 3—3, but prior to its entering service, illustrating a third embodiment of the invention.

FIG. 2 depicts an approach for practicing the present invention. FIGS. 3–5 illustrate structures produced by this approach. An article and thence a substrate 70 with a surface 72 is provided, numeral 50. The article is preferably a component of a gas turbine engine, preferably the turbine disk 22 or the forward seal 38. The article is typically a polycrystal made of a nickel-base superalloy. As used herein, "nickel-base" means that the composition has more nickel present than any other element. The nickel-base superalloys are typically of a composition that is strengthened by the precipitation of gamma-prime phase or a related phase. The nickel-base superalloy alloy typically has a composition, in weight percent, of from about 4 to about 25 percent cobalt, from about 10 to about 20 percent chromium, from about 0 to about 7 percent aluminum, from 0 to about 12 percent molybdenum, from about 1 to about 5 percent tungsten, from about 0 to about 3 percent tantalum, from o to about 6 percent titanium, from 0 to about 6 percent niobium, from 0 to about 0.3 percent carbon, from 0 to about 0.02 percent boron, from 0 to about 1.5 percent hafhium, balance nickel and incidental impurities. Specific examples of nickel-base superalloys with which the present invention is operable are Rene 88DT, having a nominal composition in weight percent of 13 percent cobalt, 16 percent chromium, 2.1 percent aluminum, 3.7 percent titanium, 4 percent tungsten, 0.7 percent niobium, 4 percent molybdenum, 0.03 percent zirconium, balance nickel and minor elements; and ME3, having a nominal composition in weight percent of 20.6 percent cobalt, 13 percent chromium, 3.4 percent aluminum, 3.7 percent titanium, 2.1 percent tungsten, 2.4 percent tantalum, 0.9 percent niobium, 3.8 percent molybdenum, balance nickel and minor elements. The present approach is operable with other alloys as well The substrate 70 is typically worked to its desired shape and size, as by forging or rolling, as part of step 50. It may optionally thereafter be mechanically processed, numeral 52, using a metalworking technique such as machining, peening, or grit blasting. In machining, material is removed from the surface 72 of the substrate 70 in relatively large cuttings or other pieces or amounts. In grit blasting, a relatively small amount of material is removed from the surface 72 by contact with an abrasive grit propelled toward the surface. In peening, material is not removed from the surface 72 but instead the surface 72 is worked by the impingement of shot. Machining, grit blasting, and peening are all known metalworking techniques for use in other contexts.

Optionally, a protective coating 74 may be deposited on the surface 72, numeral 54. FIG. 3 illustrates the case where such a protective coating 74 is deposited, while FIGS. 4 and 5 illustrate cases where no such protective coating 74 is applied. Such a protective coating 74 may be an aluminide or chromide coating deposited by a process such as chemical vapor deposition, slurry, or pack cementation.

The substrate 70, with or without practicing the optional steps 52 and/or 54, is oxidized, numeral 56. If step 54 is not employed, the surface 72 of the substrate 70 is oxidized (FIG. 4 and FIG. 5). If step 54 is employed, a surface 76 of the protective coating 74 is oxidized (FIG. 3). The oxidation 56 is performed after steps 52 and 54, if any, and before placing the component into service. The step 56 is therefore performed in the absence of combustion gas, bleed gas, and the corrosive species that are present in the vicinity of the gas turbine disk during service. The oxidation 56 produces a layer 78 comprising oxides of the elements present at the exposed surface 72 or 76. This layer 78 is termed herein an "oxide layer", although it may also contain non-oxide species such as nitrides and specifically titanium nitride, if the oxidation step 56 is performed in an atmosphere that contains nitrogen.

The oxide layer 78 is formed by heating the substrate 70 and the protective coating 74, where present, in an oxygen-containing atmosphere. In one embodiment, the oxygen-containing atmosphere has from about 0.2 to about 1000 parts per million of oxygen, preferably from about 0.2 to about 100 parts per million of oxygen. This atmosphere may be a partial vacuum, or a mix of oxygen and an inert gas such as argon. In another embodiment, the oxygen-containing atmosphere is air at atmospheric pressure, which contains about 21 percent by volume of oxygen and about 78 percent by volume nitrogen.

The oxidation 56 is preferably performed at temperature of at least about 1200° F. to about 1550° F., for a time of at least about 2 hours, and in the oxidizing environment. Preferably, the oxidation 56 is performed at a temperature of about 1300° F. for a time of from about 8 to about 36 hours.

The result of the oxidation treatment 56 is the oxide layer 78. The oxide layer 78 is preferably at least about 500 Angstroms thick, is preferably from about 500 Angstroms to about 6000 Angstroms thick, and is most preferably from about 1000 Angstroms to about 3000 Angstroms thick. If the oxide layer 78 is thinner than about 500 Angstroms, there is the possibility of incomplete coverage and defects extending through the oxide layer 78. If the oxide layer 78 is thicker than about 6000 Angstroms, there is an increasing likelihood of spallation of the oxide layer 78 during the thermal cycling that is associated with service of the turbine component, with an associated shortening of the life of the component. In the preferred form of the invention, that of FIG. 4 where steps 54 and 58 are not employed, this thin oxide layer 78 adds virtually no thickness or weight to the article that is oxidized.

The oxide layer 78 predominantly comprises aluminum oxide and/or chromium oxide, but it may also include other constituents such as titanium oxide, nickel oxide, and cobalt oxide. It may also contain nitrides such as titanium nitride, if the oxidation 56 is performed in air. As noted earlier, the composition of the oxide layer 78 depends upon the elements that are found at the surface 72 or 76 that is exposed during the oxidation. A feature of the present approach is that the surface oxidation is not a line-of-sight process, so that all portions of the surface 72 or 76 are covered and protected.

A top coating 80 (FIG. 5) may optionally thereafter be applied over the oxide layer 78, numeral 58. The top coating 80 may be of any operable type, such as aluminum oxide, tantalum oxide, titanium oxide, silicon oxide, or chromium oxide. The top coating 80 may be applied by any operable technique, such as chemical vapor deposition. The top coating step 58 may be used with the approach of FIGS. 3, 4, or 5.

After the oxidation 56 and any of the optional steps 52, 54, and 58, the component is placed into service, numeral 60. Only then, during service, is the component exposed to the hot gases and ingested dirt containing corrosive species such as sulfides and sulfates. The placing into service is performed only after the oxidation step 56 is complete and the substrate 70 is protected by the oxide layer 78.

The present invention was reduced to practice using a Rene' 88DT substrate 70 in flat-panel tests and the embodiment of FIG. 4. Specimens of the substrate 70 were given controlled oxidation treatments (step 56) at 1300° F. for times of 8, 12, 16, 24, and 48 hours in air. For comparison, other specimens were not, oxidized in this manner at all, and other specimens were given a simulated first engine service cycle in an engine environment. The specimens were then tested in an accelerated corrosion test at 1300° F. for 2 hours in an environment of sodium sulfite, calcium sulfate, and carbon. The surfaces of the specimens were inspected after every cycle. Failure was determined as the number of cycles required to cause base metal pitting.

Figure 6:
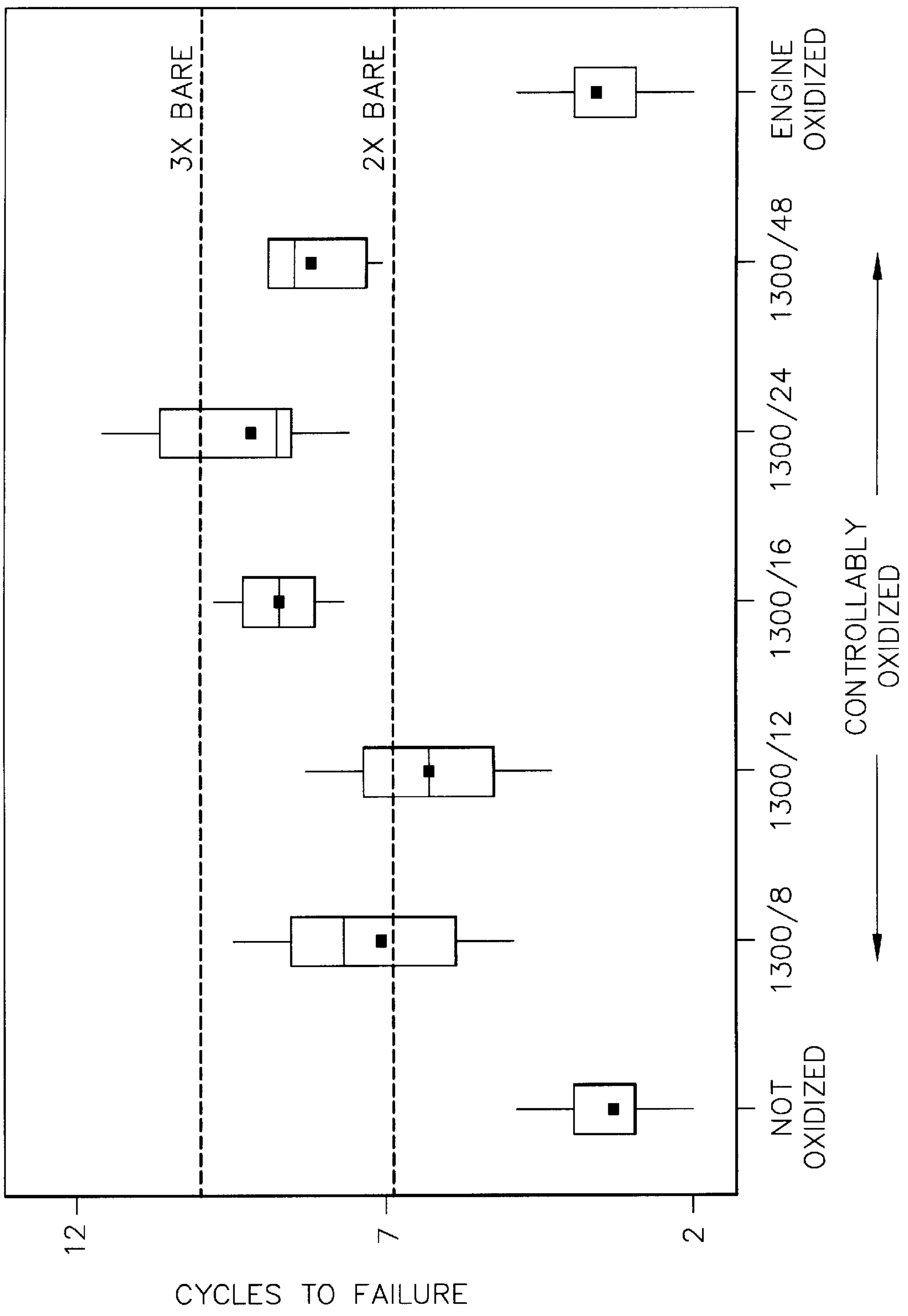
FIG. 6 is a chart comparing the cycles to failure for specimens given various treatments.

FIG. 6 presents the comparative corrosion test results. (The nomenclature 1300/8 means a controllable oxidation at 1300° F. for 8 hours.) The specimen that was not controllably oxidized and the specimen that was engine oxidized failed after about 3 cycles. Specimens given the controlled oxidation had corrosion test lives ranging from about 6 to about 9 cycles, a significant improvement.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method for fabricating a gas turbine component, comprising the steps of:

furnishing a substrate shaped as a gas turbine component made of a nickel-base superalloy; thereafter oxidizing the substrate to produce an oxidized substrate, the step of oxidizing, being conducted at a temperature of at least about 1200° F., for a time of at least about 2 hours, and in an oxygen-containing atmosphere that does not contain combustion gas; and thereafter placing the oxidized substrate into service.

2. The method of claim 1, wherein the step of furnishing the substrate includes a step of mechanically processing the substrate using a process selected from the group consisting of machining, peening, and grit blasting.

3. The method of claim 1, wherein the step of furnishing the substrate includes a step of depositing a protective coating on the substrate, and wherein the step of oxidizing produces an oxidized coating.

4. The method of claim 3, wherein the step of depositing the protective coating includes the step of depositing the protective coating comprising an element selected from the group consisting of aluminum, chromium, and mixtures thereof.

5. The method of claim 1, wherein the step of oxidizing the substrate includes the step of heating the substrate in air.

6. The method of claim 1, wherein the step of oxidizing the substrate includes the step of heating the substrate in an atmosphere comprising from about 0.2 to about 1000 parts per million of oxygen.

7. The method of claim 1, including an additional step, after the step of oxidizing the substrate and prior to the step of placing the oxidized substrate into service, of depositing a top coating on the oxidized substrate.

8. The method of claim 1, wherein the step of oxidizing the substrate includes the step of oxidizing the substrate to produce an oxide layer having a thickness of from about 500 Angstroms to about 6000 Angstroms.

9. The method of claim 1, wherein the step of furnishing the substrate includes a step of furnishing a component selected from the group consisting of a gas turbine disk and a gas turbine seal.

10. A method for fabricating a gas turbine component, comprising the steps of:

furnishing a substrate shaped as a gas turbine component made of a nickel-base superalloy; thereafter oxidizing the substrate to produce an oxidized substrate having thereon an oxide layer with a thickness of at least about 500 Angstroms, the step of oxidizing being performed in an atmosphere that does not contain combustion gas; and thereafter placing the oxidized substrate into service.

11. The method of claim 10, wherein the step of furnishing the substrate includes a step of mechanically processing the substrate using a process selected from the group consisting of machining, peening, and grit blasting.

12. The method of claim 10, wherein the step of finishing the substrate includes a step of furnishing a component selected from the group consisting of a gas turbine disk and a gas turbine seal.

13. The method of claim 10, wherein the step of furnishing the substrate includes a step of depositing a protective coating on the substrate, and wherein the step of oxidizing produces an oxidized protective coating.

14. The method of claim 13, wherein the step of depositing the protective coating includes the step of depositing the protective coating comprising an element selected from the group consisting of aluminum and chromium, and mixtures thereof.

15. The method of claim 10, wherein the step of oxidizing the substrate includes the step of heating the substrate in air.

16. The method of claim 10, wherein the step of oxidizing the substrate includes the step of heating the substrate in an atmosphere comprising from about 0.2 to about 1000 parts per million of oxygen.

17. The method of claim 10, wherein the step of oxidizing the substrate includes the step of heating the substrate to a temperature of at least about 1200° F. for a time of at least about 2 hours.

18. The method of claim 10, including an additional step, after the step of oxidizing the substrate and prior to the step of placing the oxidized substrate into service, of depositing a top coating on the oxidized substrate.

19. The method of claim 10, wherein the step of oxidizing the substrate includes the step of oxidizing the substrate to produce the oxide layer with the thickness of from about 500 Angstroms to about 6000 Angstroms.

* * * * *